3,382,192
METHOD FOR THE PREPARATION OF POLYMERS OF ALKYLENE OXIDE UTILIZING A COMPLEX CATALYST
Shun Kawamura, Minoo, Hideo Matsumaru, Nishinomiya, Junji Ogura, Minoo, Yutaka Matsui, Ashiya, and Junji Furukawa and Takeo Saegusa, Kyoto, Japan, assignors to Takeda Chemical Industries, Ltd., Osaka, Japan
No Drawing. Continuation-in-part of application Ser. No. 177,203, Mar. 5, 1962. This application Apr. 15, 1966, Ser. No. 542,766
Claims priority, application Japan, Mar. 14, 1961, 36/8,829, 36/8,830
13 Claims. (Cl. 260—2)

ABSTRACT OF THE DISCLOSURE

There is provided an improvement in the process of polymerizing alkylene oxides in the presence of a catalyst. The improvement resides in the employment of a co-catalyst composed of (1) a member selected from the group consisting of alumina and silica, and (2) a member selected from the group consisting of $M(OC_2H_5)_n$ and a product of the reaction between $M(C_2H_5)_n$ and R—OH. M represents a metal of the group of zinc and aluminum, $n$ represents a positive whole number corresponding to the valence of M, and R is a member selected from the group consisting of hydrogen, methyl and ethyl.

---

This application is a continuation-in-part application of Ser. No. 177,203, filed Mar. 5, 1962, now abandoned.

The present invention relates to a method for preparing alkyleneoxide polymers. More particularly, the present invention relates to a method for preparing said polymers in the presence of a complex catalyst composed of (1) alumina or silica, and (2) $M(OC_2H_5)_n$ or the reaction product of $M(C_2H_5)_n$ and R—OH, wherein M is zinc or aluminum, $n$ is a positive whole number corresponding to the valence of M, and R is hydrogen, methyl or ethyl.

Alkyleneoxides have been polymerized in the past by using a catalyst such as alumina, metal oxide, or the like. The polymers obtained by using such catalysts have, however, a very low molecular weight and, in addition, their intrinsic viscosity is very low, e.g. about 1 to 2.

Other methods for polymerizing said alkylene oxides have also been practiced but generally such methods also obtain polymers having a low molecular weight and in addition, the yields of such polymers are low. Moreover, a large quantity of catalyst must be used. Since a large quantity of catalyst must be used the catalyst becomes intermixed with the thus-produced polymers and hence in order to separate the catalyst from the polymers the polymers must first be dissolved in a solvent and then the catalyst must be separated from the solution by, e.g. centrifugal separation, filtration, drying, etc. Therefore, investigation still continues in an effort to find a process which can produce polymers of alkyleneoxide in good quantity, using a small amount of catalyst, and at the same time, producing a polymer having a relatively high molecular weight and intrinsic viscosity.

The primary object of the present invention is the embodiment of a process which fulfills the enumerated desiderata, viz. a process which produces a polymer having a relatively high molecular weight and intrinsic viscosity and also in good yield.

Other objects will be apparent from the following description.

Briefly stated, the present invention essentially realizes the aforementioned object by polymerizing alkyleneoxide using a small amount of a complex catalyst composed of (1) alumina or silica and (2) $M(OC_2H_5)_n$ or a product of the reaction between $M(C_2H_5)_n$ and R—OH, wherein M represents zinc or aluminum, $n$ is a positive whole number corresponding to the valance of M, and R represents hydrogen, methyl or ethyl. The complex catalyst of the present invention is partly composed of alumina, silica, or an admixture thereof. These compounds can be employed per se, but more preferably the compounds are finely grained. This aspect will be discussed in more detail infra.

In the prior methods, in which alumina is employed as a catalyst for preparing polyalkyleneoxides, the alumina has usually been prepared by roasting aluminum hydroxide which is, for example, made by the neutralization reaction of an aluminum salt or aluminate, by hydrolysis of aluminum amalgam with water or steam, or by hydrolyzing aluminum alcoholates with water.

Alumina prepared by such processes as set forth above has rather large granules and its catalytic action is rather weak. Accordingly, polymerizing alkyleneoxides using such a catalyst requires a long time as well as a large amount of alumina and, in addition, the degree of polymerization of the obtained polymer is very low.

Also, when alumina is prepared by the prior art processes it is usually contaminated with acids or halogens. Generally, when polymerizing alkyleneoxides the presence of such acids for example, sulfuric acid, nitric acid, etc., or halogens hinders the reaction. Therefore, the use of alumina prepared by prior art methods is, in general, not entirely satisfactory.

The present invention is inter alia predicated on the discovery that when fine grained active alumina is used as the catalyst in such polymerization reaction, highly polymerized alkyleneoxide is obtained in good yield using a very small amount of catalysts. The aforesaid fine grained alumina is prepared, for example, by roasting aluminum hydroxide which in turn is prepared by reacting an aluminum alcoholate with steam. Hence, such alumina is preferably used as one of the components of the instant catalyst.

As pointed out supra, the alumina or silica can be used per se; however, it is preferable to use alumina or silica in which the grains are very fine. In particular, the grains of alumina or silica should be smaller than about 100 millimicrons, and preferably less than about 30 millimicrons in diameter.

The aforesaid fine grained alumina or silica is obtained by roasting the corresponding hydroxide at a temperature of 200 to 700° C. for about 2 to 20 hours. Such hydroxides are obtained by reacting the corresponding alkoxides or alkylated compounds with steam or a mixed gas containing steam. The alumina or silica prepared by such a method has grains which are from 5 to 30 millimicrons in diameter. Of course, it is not necessary that the alumina or silica of this invention be prepared by the foregoing method; it is only necessary that the grains of alumina or silica be smaller than 100 millimicrons and, more particularly, preferably smaller than about 30 millimicrons in diameter. However, it should be emphasized that the alumina or silica prepared by the foregoing method is very desirable because they do not contain any acids or halogens which, as pointed out supra, hinders the polymerization reaction of alkyleneoxide.

The other component of the complex catalyst of this invention is either (1) the ethoxide of zinc or aluminum having the formula $M(OC_2H_5)_n$ wherein M and $n$ both have the same significance as set forth above or, (2) the reaction product of aluminum alkyl or zinc alkyl with ethanol, methanol, water or a mixture thereof.

The reaction of an alkylated metal with alcohol or water is rather violent and the reaction proceeds rapidly by merely mixing the aforesaid alkylated metal with alcohol or water.

The ratio of the reactants is not critical; however, generally, a molar excess of alcohol or water relative to the alkyl metal is used.

When the alcohol is the reactant, the reaction product appears to be an alkoxy metal in which only the alkoxyl group combines with the metal. In the alternative, the reaction product may be an alkyl-alkoxyl metal in which the alkoxyl group and the alkyl group combine with the metal or, the reaction product could be a coordination compound in which the alcohol is coordinated to the alkyl-alkoxy metal. In addition, the reaction product could be a mixture of the aforesaid products.

When water is the reactant, the product seems to be an intermediate to a metal hydroxide in which only the hydroxide groups combine with the metal, such as metal compounds in which the hydroxyl group and/or alkyl group combine with the metal, or a mixture of such compounds.

The same compounds prepared by other methods may, of course, be used in the process of the present invention. In the method of this invention, the above-mentioned reaction product may be used as a solution without any further treatment, such as isolating the metal compound etc. and purifying the same.

One or more of the above-mentioned reaction products may be used as a component of complex catalysts of this invention. In the case of alkyl metals and alcohols a mixture of two or more may be used also.

The particular amount of the complex catalyst of this invention necessary to polymerize alkyleneoxide is not critical but, surprisingly, the amount necessary to polymerize alkyleneoxide is very small, e.g. about 0.01 to 1% by weight of said catalyst relative to the alkyleneoxide. The ratio of component (1) to component (2), in the present complex catalyst is not particularly critical and depends on the reaction conditions, the desired product, etc. For example, the ratio of component (1) to component (2) is preferably in the range of 10:1–1,000. The temperature of the reaction is from 0–150° C., preferably about 40–100° C.

The use of a solvent in the present method is not necessarily required. However, preferably the reaction is conducted in a solvent such as benzene, alkyl-substituted benzenes, and various saturated hydrocarbons, and various ethers, e.g. dioxane, tetra-hydrofurane and the like. The reaction can be conducted at either atmospheric pressure or elevated pressures. The alkyleneoxide starting material may be either a gas or a liquid if, for example, the reaction is conducted in an autoclave under elevated pressure.

The components of the present complex catalyst may be added separately to the reaction or, in the alternative, may be added as an admixture. The reaction product between $M(C_2H_5)_n$ and R—OH may be prepared beforehand; however, they may be added separately to the reaction in which case they react with each other during the course of the polymerization reaction. In the latter event, these reactants may be added to the reaction system either simultaneously or separately. If the polymerization reaction is drastic it can be controlled by adding alcohol or water with a metal alkyl solution which has previously been diluted with a suitable solvent.

Since there is a strong possibility of a violent reaction, i.e. combustion, when alkyl metal is brought into contact with air, it is generally preferable to exclude air from the reaction system. This may be done by replacing the air with an inert gas (e.g. nitrogen, carbon dioxide, etc.). This is particularly desirable when the alcohol or water, and the metal alkyl, are separately added to the system.

The actual polymerization reaction is conducted in a manner known per se. For example, the alkyleneoxide can be introduced in the gaseous state under atmospheric pressures into a solution consisting of solvent and catalyst. Also the reaction may be conducted at an elevated pressure by putting the catalyst, the solvent, and liquid alkyleneoxide into an autoclave. In order to isolate and purify the alkyleneoxide polymer from the reaction mixture any of well known methods can be used.

The term "alkyleneoxide" as used in the present invention signifies a compound in which one oxygen atom combines with an adjacent carbon atom in the molecule. Examples of these compounds that may be mentioned are lower alkylene compounds such as ethylene oxide, propyleneoxide, butylene oxide and butadiene monooxide, and styrene oxide. In addition, the present invention is also applicable to preparing copolymers of two or more of the aforementioned monomers.

As detailed above high molecular polymers having a high intrinsic viscosity, i.e. above 8, e.g. 10–20, can easily be prepared by the method of the present invention utilizing a very small amount of catalyst relative to the amount of catalyst necessary in the prior art methods. Since a very small amount of catalyst is necessary in the present invention there is very little catalyst mixed with the polymer and therefore it is not necessary to separate the catalyst from the polymer.

As is pointed out above, the intrinsic viscosity of the polymers obtained by the present method is between about 8–20 and preferably between 10–20. Such polyalkyleneoxides are much more suitable than the low molecular weight polyalkyleneoxides known heretofore. For example, polyalkyleneoxides produced by the method of this invention are suitable as fibers, cosmetics, industrial chemicals, packing materials, water soluble films, thickeners, binding agents, soil conditioners, etc., because of their hard, strong, non-hygroscopic and water soluble properties. Additional, polypropyleneoxides and polybutyleneoxide produced by the present invention are water insoluble, strong and elastic rubber-like materials and therefore are very useful as elastics, plastics, etc.

The following examples are presently preferred specific embodiments and are for the purpose of illustrating the invention and are not to be considered as limitations thereon. The following examples, the relation between the parts by weight and parts by volume is the same as that between that of grams and milliliters.

EXAMPLE 1

In a pressure bottle is placed 20 parts of ethyleneoxide, 50 parts of benzene, 0.4 part of zinc diethoxide and 0.2 part of about 300-mesh alumina as the catalyst, and after the air in the bottle was replaced with nitrogen gas, the bottle is closed.

The mixture is stirred at 50° C. for 10 hours. After the end of the reaction the solvent of the reaction mixture is evaporated under reduced pressure and there is obtained 6.5 parts of solid polymer.

Intrinsic viscosity: 14.0 (in aqueous solution, at 30° C.).

EXAMPLE 2

In a pressure bottle is placed 20 parts of ethyleneoxide, 10 parts of hexane, 0.2 part of alumina and 0.8 part of zinc ethoxide, and the mixture is allowed to react at 60° C. for 18 hours in the same way as in Example 1.

The product is separated in the same way as in Example 1 and there is obtained 18.0 parts of polymer.

Intrinsic viscosity: 20.9.

EXAMPLE 3

In a pressure bottle is placed 29 parts of propyleneoxide, 50 parts of hexane, 0.4 part of alumina and 0.8 part of zinc ethoxide. The mixture is allowed to react at 60° C. for 10 hours in the same way as in Example 1. The product is treated in the same way as in Example 1 and there is obtained 19 parts of polymer.

Intrinsic viscosity: 10.8 (in benzene solution, at 30° C.).

EXAMPLE 4

In a pressure bottle is placed 20 parts of ethyleneoxide, 50 parts of hexane, 0.4 part of alumina and 0.8 part of aluminum ethoxide.

The mixture is allowed to react at 80° C. for 20 hours in the same way as in Example 1 and the product is treated in the same way as in Example 1 to obtain 14.5 parts of polymer.

Intrinsic viscosity: 10.1.

EXAMPLE 5

In a pressure bottle is placed 20 parts of benzene. After the air in the bottle was replaced with nitrogen gas, 0.4 part of zinc diethyl is added, and 0.16 part of absolute alcohol is added dropwise. And then 0.2 part of about 300-mesh alumina and 20 parts of ethyleneoxide are added, and after closing the bottle, the mixture is stirred at 50° C. for 10 hours. After the end of the reaction, the solvent of the reaction mixture is evaporated under reduced pressure to obtain 8.5 parts of solid polymer.

Intrinsic viscosity: 14.6 (in aqueous solution, at 30° C.).

EXAMPLE 6

In a pressure bottle is placed 70 parts of hexane, 0.8 part of zinc diethyl, 0.32 part of absolute alcohol, 0.2 part of alumina and 20 parts of ethylene oxide. The mixture is allowed to react at 60° C. for 18 hours in the same way as in Example 1. Then 18.8 parts of polymer are obtained.

Intrinsic viscosity: 20.9.

EXAMPLE 7

In a pressure bottle is placed 29 parts of propyleneoxide, 50 parts of hexane, 0.4 part of alumina, 0.8 part of zinc diethyl and 0.32 part of absolute alcohol. The mixture is allowed to react at 60° C. for 10 hours in the same way as in Example 1 to obtain 19 parts of polymer.

Intrinsic viscosity: 10.8 (in benzene solution, at 30° C.).

EXAMPLE 8

In a pressure bottle is placed 20 parts of ethyleneoxide, 50 parts of hexane, 0.4 part of alumina, 0.8 part of triethylaluminum and 0.32 part of absolute alcohol. The mixture is allowed to react at 80° C. for 20 hours in the same way as in Example 1 to obtain 14 parts of polymer.

Intrinsic viscosity: 10.1.

EXAMPLE 9

In a pressure bottle is placed 100 parts of benzene and 0.5 part of fine grained active alumina, the grains of which have an average diameter of 5 millimicrons and, in which, even a trace amount of impurities are not present. After the air in the bottle was replaced with nitrogen gas, 0.5 part of zinc diethyl is added, and, thereafter 100 parts of ethyleneoxide is added and the bottle is closed. The mixture is stirred at 80° C. for 15 hours. At the end of the reaction 100 parts of polymer are obtained.

Intrinsic viscosity: 11.8 (in aqueous solution, at 30° C.).

EXAMPLE 10

In a pressure bottle in which the air was replaced with nitrogen gas, is placed 50 parts of benzene, 0.3 of zinc diethyl, 0.12 part of ethanol, 100 parts of ethyleneoxide and 0.2 part of fine grained active alumina, which is about 5 millimicrons in average diameter and in which even a trace amount of impurities is not present. After closing the bottle, the mixture is stirred at 70° C. for 18 hours.

At the end of the reaction, the solvent of the reaction mixture is evaporated under reduced pressure to obtain 98 parts of polymer.

Intrinsic viscosity: 20.0.

EXAMPLE 11

In a pressure bottle in which the air was replaced with inert gas, is placed 50 parts of hexane, 0.4 part of zinc diethyl, 0.16 part of ethanol, 100 parts of propyleneoxide and 0.3 part of fine grained active alumina, of the same purity and size as in Example 10. After closing the bottle, the mixture is stirred at 100° C. for 20 hours.

At the end of the reaction, the solvent of the reaction mixture is evaporated under diminished pressure to obtain 85 parts of polymer.

Intrinsic viscosity: 14.8 (in benzene solution, at 30° C.).

EXAMPLE 12

In a pressure bottle in which the air was replaced with inert gas, are placed 50 parts of benzene, 0.5 part of zinc diethyl, 0.15 part of methanol, 70 parts of ethylene oxide, 30 parts of propyleneoxide and 0.3 part of fine grained active alumina, of the same purity and size as in Example 10.

After closing the bottle, the mixture is stirred at 80° C. for 24 hours. Then the solvent of the reaction mixture is evaporated under reduced pressure to obtain 95 parts of polymer. The co-polymer is soluble in water.

Intrinsic viscosity: 15.1 (in aqueous solution, at 30° C.).

EXAMPLE 13

In a pressure bottle in which the air was replaced with nitrogen gas, is placed 100 parts of ethyleneoxide, 200 parts of benzene, 0.5 part of zinc ethoxide and 0.3 part of fine grained active alumina of the same purity and size as in Example 10. After closing the bottle, the mixture is stirred at 70° C. for 30 hours. Then the solvent of the reaction mixture is evaporated under reduced pressure to obtain 100 parts of polymer.

Intrinsic viscosity: 18.2 (in aqueous solution, at 30° C.).

EXAMPLE 14

In a pressure bottle in which the air was replaced with nitrogen gas, is placed 100 parts of ethyleneoxide, 100 parts of hexane, 0.5 part of zinc ethoxide and 0.3 part of fine grained active alumina, of the same purity and size as in Example 10. After closing the bottle, the mixture is stirred at 60° C. for 30 hours. Then the solvent of the reaction mixture is evaporated under reduced pressure to obtain 93 parts of polymer.

Intrinsic viscosity: 20.0.

EXAMPLE 15

In a pressure bottle in which the air was replaced with nitrogen gas, is placed 100 parts of ethyleneoxide, 0.3 part of zinc ethoxide and 0.3 part of fine grained active alumina, which is about 8 millimicrons in average diameter and in which even a trace amount of impurities cannot be found. After closing the bottle, the mixture is stirred at 60° C. for 24 hours. Then the solvent of the reaction mixture is evaporated under reduced pressure to obtain 91 parts of polymer.

Intrinsic viscosity: 25.5.

EXAMPLE 16

A hundred parts of propyleneoxide, 0.5 part of zinc ethoxide and 0.5 part of fine grained active alumina which is about 8 millimicrons in diameter and in which a trace amount of impurities cannot be found, are allowed to react at 110° C. for 12 hours in the same way as in Example 15 to obtain 82 grams of polymer.

Intrinsic viscosity: 14.0 (in benzene solution, at 30° C.).

EXAMPLE 17

Twenty parts of propyleneoxide, 80 parts of ethyleneoxide, 50 parts of benzene, 0.5 part of zinc ethoxide and 0.5 part of fine grained active alumina which is about 5 millimicrons in diameter and in which even a trace amount of impurities cannot be found, are allowed to react at 90° C. for 18 hours in the same way as in Example 15 to obtain 100 grams of polymer.

Intrinsic viscosity: 16.0 (in aqueous solution, at 30° C.).

EXAMPLE 18

A hundred parts of benzene, 0.1 part of zinc diethyl, 0.029 part of distilled water, 100 parts of ethyleneoxide and 0.2 part of fine grained active alumina which is about 5 millimicrons in diameter and in which even a trace amount of impurities cannot be found, are allowed to react at 70° C. for 10 hours in the same way as in Example 15 to obtain 80 parts of polymer.

Intrinsic viscosity: 10.9 (in aqueous solution, at 30° C.).

EXAMPLE 19

Fifty parts of benzene, 0.3 part of zinc diethyl, 0.0435 part of distilled water, 100 parts of ethyleneoxide and 0.3 part of fine grained active alumina which is about 5 millimicrons in diameter and in which even a trace amount of impurities cannot be found, are allowed to react at 60° C. for 30 hours in the same way as in Example 15 to obtain 98 parts of polymer.

Intrinsic viscosity: 22.5.

EXAMPLE 20

Fifty parts of hexane, 0.3 part of zinc diethyl, 0.0436 part of distilled water, 100 parts of propyleneoxide and 0.3 part of fine grained active alumina which is about 5 millimicrons in diameter and in which even a trace amount of impurities cannot be found, are allowed to react at 120° C. for 12 hours in the same way as in Example 15 to obtain 92 parts of polymer.

Intrinsic viscosity: 10.2 (in benzene solution, at 30° C.).

EXAMPLE 21

Fifty parts of benzene, 0.2 part of zinc diethyl, 0.029 part of distilled water, 80 parts of ethyleneoxide, 20 parts of propyleneoxide and 0.3 part of fine grained active alumina which is about millimicrons in diameter and in which even a trace amount of impurities cannot be found, are allowed to react at 90° C. for 20 hours in the same way as in Example 15 to obtain 100 parts of polymer. The co-polymer is soluble in water.

Intrinsic viscosity: 8.0 (in aqueous solution, at 30° C.).

What is claimed is:

1. In a process of polymerizing alkyleneoxides in the presence of a catalyst the improvement wherein the catalyst is composed of (1) a member selected from the group consisting of alumina and silica, and (2) a member selected from the group consisting of $M(OC_2H_5)_n$ and a product of the reaction between $M(C_2H_5)_n$ and R—OH, wherein M is a member selected from the group consisting of zinc and aluminum, $n$ is a positive whole number corresponding to the valence of M, and R is a member selected from the group consisting of hydrogen, methyl and etyl, and wherein a molar excess of alcohol or water relative to the alkyl metal is employed therein.

2. The process according to claim 1 wherein alumina is fine grained active alumina.

3. A method according to claim 1 wherein silica is fine grained active silica.

4. A method according to claim 1 wherein the complex catalyst is composed of alumina and a product of the reaction between $Zn(C_2H_5)_2$ and $H_2O$.

5. A method according to claim 1 wherein the complex catalyst is composed of alumina and a product of the reaction between $Zn(C_2H_5)_2$ and methanol.

6. A method according to claim 1 wherein the complex catalyst is composed of alumina and a product of the reaction between $Zn(C_2H_5)_2$ and ethanol.

7. A method according to claim 1 wherein the complex catalyst is composed of alumina and a product of the reaction between $Al(C_2H_5)_3$ and $H_2O$.

8. A method according to claim 1 wherein the complex catalyst is composed of alumina and a product of the reaction between $Al(C_2H_5)_3$ and methanol.

9. A method according to claim 1 wherein the complex catalyst is composed of alumina and a product of the reaction between $Al(C_2H_5)_3$ and ethanol.

10. A method according to claim 1 wherein the complex catalyst is composed of alumina and $Zn(OC_2H_5)_2$.

11. A method according to claim 1 wherein the complex catalyst is composed of alumina and $Al(OC_2H_5)_3$.

12. A method according to claim 1 wherein the complex catalyst is composed of fine grained active alumina and a product of the reaction between $M(C_2H_5)_n$ and R—OH.

13. A method according to claim 1 wherein the complex catalyst is composed of fine grained active alumina and $M(OC_2H_5)_n$.

References Cited

FOREIGN PATENTS 1,264,491   5/1961   France.

OTHER REFERENCES

Furukawa et al., "Journal Polymer Science," 36, April 1959, pp. 541–543.

Furukawa et al., "Die Makromolekular Chemie," 36, No. 1, December 1959, pp. 25–39.

WILLIAM H. SHORT, *Primary Examiner.*

T. PERTILLA, *Assistant Examiner.*